US008610308B2

(12) United States Patent
Shires et al.

(10) Patent No.: US 8,610,308 B2
(45) Date of Patent: Dec. 17, 2013

(54) SYSTEM AND METHOD FOR ELECTRICAL POWER CONVERSION

(75) Inventors: Jerry O. Shires, Plano, TX (US); Raymond L. Beutel, Dallas, TX (US)

(73) Assignee: Unitron, L.P., Dallas, TX (US)

( * ) Notice: Subject to any disclaimer, the term of this patent is extended or adjusted under 35 U.S.C. 154(b) by 852 days.

(21) Appl. No.: 12/377,368

(22) PCT Filed: May 5, 2005

(86) PCT No.: PCT/US2005/015421
§ 371 (c)(1),
(2), (4) Date: Dec. 11, 2009

(65) Prior Publication Data
US 2010/0201197 A1  Aug. 12, 2010

(51) Int. Cl.
*H02J 1/00* (2006.01)
(52) U.S. Cl.
USPC .......................................................... 307/73
(58) Field of Classification Search
USPC .......................................................... 307/73
See application file for complete search history.

(56) References Cited

U.S. PATENT DOCUMENTS

| 5,646,458 | A | 7/1997 | Bowyer et al. | |
|---|---|---|---|---|
| 5,920,467 | A | 7/1999 | Bowyer et al. | |
| 5,982,645 | A * | 11/1999 | Levran et al. | 363/37 |
| 6,178,101 | B1 | 1/2001 | Shires | |
| 6,278,624 | B1 * | 8/2001 | Nelson | 363/65 |
| 6,979,916 | B2 * | 12/2005 | Schienbein et al. | 307/82 |
| 7,013,254 | B2 * | 3/2006 | Gauthier et al. | 703/18 |
| 7,042,110 | B2 * | 5/2006 | Mikhail et al. | 290/44 |
| 2003/0155813 | A1 | 8/2003 | Thomas | |
| 2004/0070278 | A1 | 4/2004 | Divan et al. | |
| 2004/0169422 | A1 | 9/2004 | Eaton et al. | |
| 2005/0135031 | A1 | 6/2005 | Colby et al. | |
| 2006/0043797 | A1 | 3/2006 | Hjort et al. | |
| 2007/0164612 | A1 * | 7/2007 | Wendt et al. | 307/45 |

FOREIGN PATENT DOCUMENTS

EP   1107437 A2   6/2001

OTHER PUBLICATIONS

European Patent Office; Supplementary European Search Report for related application EP 05 85 6686; Christian Bergler; Feb. 6, 2013; 2 pages.

* cited by examiner

*Primary Examiner* — Rexford Barnie
*Assistant Examiner* — Dru Parries
(74) *Attorney, Agent, or Firm* — Howison & Arnott, L.L.P.

(57) ABSTRACT

A system for combining electrical power from two or more power sources includes first and second conversion stages (120) which receive input power from two or more power sources (110), and produce different output voltages, including DC outputs. The input power sources (110) may have different voltage, frequency, and phase characteristics, and may be DC voltages. Various embodiments are disclosed for converting and combining the input power sources (110) to provide at least a DC output voltage and an optional AC output voltage which may have different voltage, frequency, and phase characteristics than the input power sources (110). In another embodiment, a method of power conversion is disclosed.

23 Claims, 19 Drawing Sheets

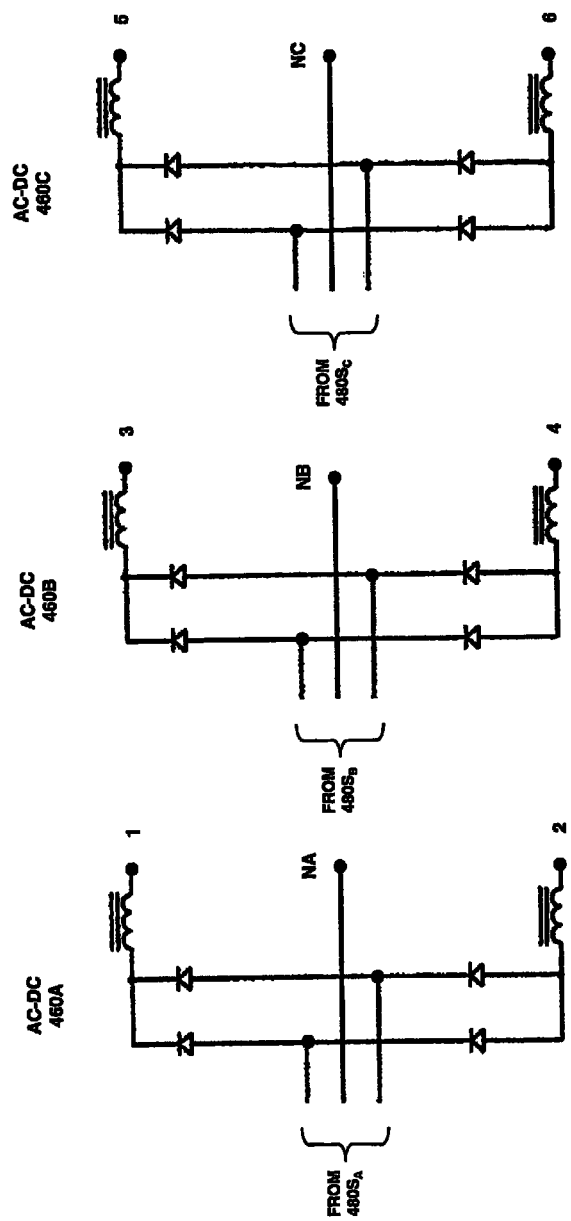

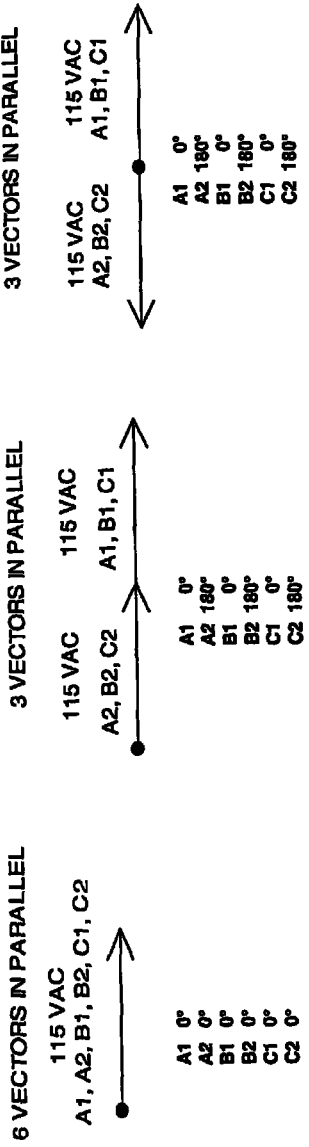
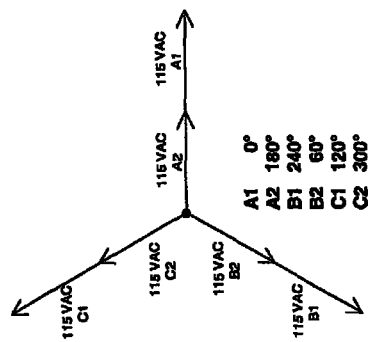
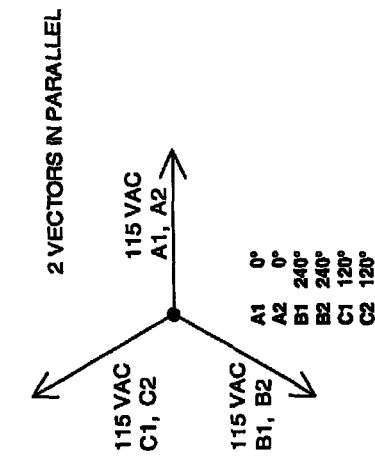
FIG. 9A  FIG. 9B  FIG. 9C  FIG. 9D  FIG. 9E

SYSTEM AND METHOD FOR ELECTRICAL POWER CONVERSION

BACKGROUND

This application is related to electrical power conversion, and in particular is related to converting and combining electrical power from multiple sources, including sources having different electrical characteristics, e.g., different frequencies and/or voltages, including DC voltages, into one or more selectable voltages at a selectable frequency or DC. In one aspect, this disclosure more particularly relates to a power converter system and method for converting electrical power of possibly different frequencies and/or voltages to different electrical power forms suitable for a variety of uses including, for example, electrical conversion useful in shipboard, ground-based, or airplane-based applications.

These uses include converting dock power for shipboard use, such as with yachts, cruise or transport ships, or military vessels for example. This disclosure also has further application to converting power for aircraft ground power systems, or transportable military or commercial ground-based systems, e.g., radar, missile batteries, or electronic warfare equipment.

One problem facing the international yachting community in particular and the international maritime community in general, is the incompatibility of dockside power with on-board ship's power requirements. For example, 60 Hertz (Hz) electrical power is widely used in North America, Japan, and parts of Africa, while 50 Hz electrical power predominates in portions of South America, Europe, and Australia. Further adding to this incompatibility is the wide variety of voltages provided at various locations throughout the world, e.g., 200, 220, 230, 240, 380, 400, 415, 460, or 480 volts (V), and the use of either single or multi-phase electrical AC power. Typically, in order to reduce expense and the types of equipment necessary on board the ship, one type of AC electrical power is often used, e.g., either 50 or 60 Hz, at a particular output voltage or voltages. In addition, 400 Hz electrical power is oftentimes used in shipboard environments for specialized electronics applications.

Further problems are encountered with instability of shore power provided to a docked ship, in that voltage and/or frequency fluctuations from the shore power supply often cause so-called "voltage sag" or "brown out" conditions, which can cause damage to electrical motors and sensitive electronic equipment due to low voltage conditions or frequency shifts.

Additional problems are encountered with "dirty" dockside power, which might be susceptible to a wide variety of electrical noise such as voltage spikes, sags, surges, or harmonic distortion which also can adversely affect sensitive onboard electronic equipment.

In the absence of a system and method to convert any commercially available voltage and/or frequency power source into a form which is compatible with fixed on-board voltage/frequency equipment, generator sets, i.e., a prime mover such as a diesel engine turning an electrical generator, must be continuously run while dockside to provide shipboard electrical power. The running of generator sets causes noise, pollution, and excessive use of fuel, even when some type of shore power is present, but unusable due to different shipboard voltage requirements. Further, light loading of a generator while dockside may also create conditions which have an adverse effect on the efficiency of the prime mover.

In one conventional approach, power converters for multiple input power supplies have been coupled through associated converters to a single load, with power factor correction and power conversion conducted for each converter. Single phase AC and DC batteries have been used to provide electrical power to a load, as well as three phase AC power inputs.

In another conventional approach, proportional conversion of power from two sources has been accomplished in single phase, 110 VAC circuits by balancing current in each converter to keep the current in each branch below a threshold which will trip a breaker. Power from two separate AC power sources having the same characteristics goes through separate AC transforming circuits and rectifiers, and power factor correction has been applied in each branch. A control circuit and regulating circuit between each circuit branch controls how the total input power from the two branches is proportionally combined and applied to the load, in response to the total power withdrawn from the two power sources, and the current passing through the two circuit branches. Currents are then always balanced, thereby reducing the possibility of one circuit branch overloading and tripping a circuit breaker.

In yet another conventional approach, a marine power distribution arrangement for supplying drive power to a ship or marine vessel propulsion motor uses multiphase, multi-circuit generators to supply isolated outputs on a plurality of lines at 50/60 Hz or at frequencies greater than 50/60 Hz. The outputs may include DC and AC outputs of variable frequency, variable voltage, and variable phase.

However, none of the conventional approaches known by the present inventor disclose, teach, or suggest combining input power sources with different frequencies or voltage characteristics, including a variety of DC input voltages, with subsequent conversion of the combined power into an AC output voltage of a selectable frequency, or into a DC output voltage at a selectable level.

What is needed then, is a system and method capable of combining power sources having different electrical characteristics such as frequency and/or voltage, and providing one or more output voltages with desired frequency, voltage, and/or phase characteristics.

What is further needed is a system and method capable of receiving "dirty" shore power from multiple sources, possibly with different electrical characteristics, and converting such "dirty" electrical power into a stabilized and conditioned electrical power in a selectable form suitable for the end user.

What is still further needed is a system and method capable of ground or air transportability and which converts a variety of input voltages into a selectable form suitable for the end user.

BRIEF SUMMARY

In one aspect of an embodiment of this disclosure, a power conversion system has at least two independent power inputs which allow receipt and combination of power from multiple, possibly different type power sources, resulting in an increase in total available output power. Power is shared proportionally when the multiple power sources do not have the same power-providing capability, and the inputs are preferably transformer-isolated for compatibility with ground-fault current interrupters (GFCI).

The power inputs to the system may be considered universal in the sense that they are capable of receiving a variety of different input voltages and/or frequencies associated with international operation, e.g., voltages ranging between 120-600 VAC, for example, operating at either 50 or 60 Hz, and either single, split-phase, or three-phase service, in any phase sequence, or DC input voltages.

Each input voltage may have different voltage and frequency characteristics from each other, or may be a DC input voltage. Each input voltage is rectified (AC-DC) as necessary, and the power factor may be corrected. Then, each resulting DC voltage may be converted to an AC voltage at a selected frequency using an inverter stage. The converted AC voltages from each input source may be coupled through optional isolation transformers and combined in a single AC-DC rectification stage. Desired DC voltages may also be obtained from this section.

The resulting DC voltage from the combined rectification stage may finally be converted to an output AC voltage that is output through one or more so-called universal output inverters, arranged to provide the desired voltage, frequency, and phase characteristics, including single, split phase, or three phase operation.

In another aspect of an embodiment of this disclosure, output inverter stages of the system may be connected either in parallel or series to provide low or high output voltages matching international standards. Alternatively, the output stages may be connected in parallel to provide greater current capability in a single phase, or they may be phase shifted to provide split-phase (i.e., 180 degrees) or three-phase (i.e., 120 degrees) operation.

In various aspects of embodiments of this disclosure, the power converter system and method are capable of providing output voltages produced at any desired voltage, frequency, or phase, as well as DC output voltages, by combining multiple voltage sources, with possibly different electrical characteristics.

In various aspects, the system has multiple fully independent inputs which have the ability to share power from available power sources to increase the total available output power. These multiple inputs have the ability to share power proportionately when power sources are not equal in power capability. The inputs may be transformer isolated for compatibility with Ground Fault Current Interrupters (GFCI). Use of such isolated inputs provides the ability to ensure redundant operation, i.e., if one input fails, the other power inputs are capable of picking up the failed input's portion of the load to the extent of the power limits or capabilities of the other inputs.

The multiple power inputs may be characterized as "universal inputs" having boost type inputs which accept a wide range of input voltages over a wide range of frequencies (including DC) to allow international operation. Such inputs can be either AC or DC voltages, and are capable of automatically accepting either three phase or single phase sources. In the case of multiple phase inputs, the inputs are phase sequence tolerant, and will automatically accept any phase sequence. The universal inputs are power factor correcting which produce low input current distortion and phase shift to ensure high power factor. Further, the universal inputs operate either as voltage sources or as current sources to create voltage or current fed loads.

In other aspects of the embodiments, DC to DC conversion of an input voltage is accomplished by high frequency conversion of input DC to output DC in a manner which reduces size, weight, and cost of the converter system. High frequency conversion provides transformer galvanic isolation of input to input and inputs to output. DC to DC conversion also allows the input DC to be a different voltage than the output DC. The output may be provided as a single DC voltage or multiple DC outputs, and the output load may be a DC to AC inverter. Such a system configuration provides the ability to accept international voltages, frequencies, and phases from multiple independent inputs to produce any desired AC or DC output.

DESCRIPTION OF THE DRAWINGS

FIGS. 4C-4E illustrate one variant of AC-DC rectifier blocks;

FIGS. 9A-9E show output phasor diagrams correlated to the output configurations of FIGS. 6A-6E;

DETAILED DESCRIPTION

Various embodiments and aspects of this disclosure will now be presented with reference to the drawings.

Figure 1:
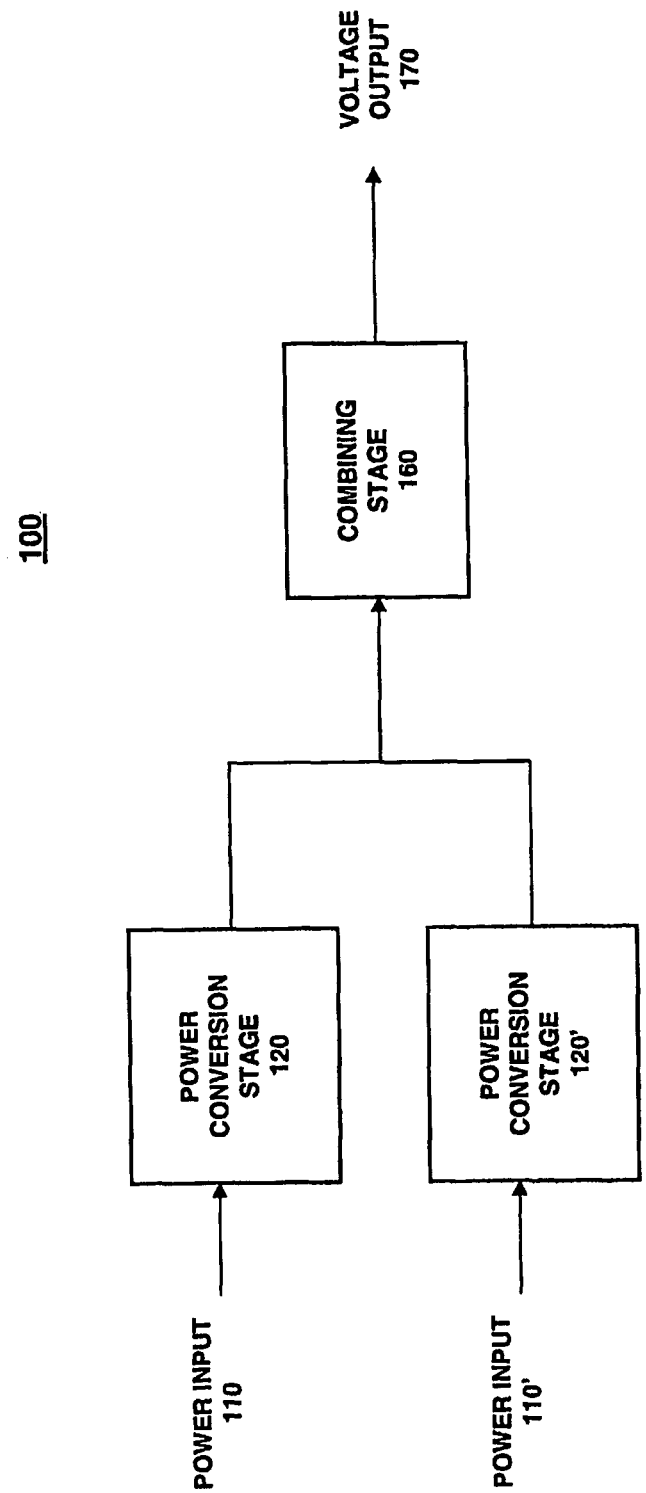
FIG. 1 illustrates one embodiment of a power conversion system useful for providing electrical power to a location which may already include one or more isolation transformers, and which may have one or more outputs, including inputs and/or outputs which may be DC voltages.

FIG. 1 illustrates one embodiment of a power conversion system 100 useful for providing electrical power or voltage output 170 to a location, e.g., a shipboard, remote ground location, or aircraft hangar, which may already include one or more isolation transformers (not shown). Shipboard isolation transformers are often used, for example, to isolate shipboard electrical systems from shore power or dockside electrical power systems. Isolation transformers are also useful for converting "Y-connected" three-phase shore power to "Δ-connected" three-phase power, which is commonly used in shipboard environments.

System 100 provides the ability to accept international voltages, frequencies, and phases from two independent inputs, and produce any output voltage, frequency, or phase required by the user, including DC voltages or frequencies in the range of 50 to 800 Hz with their respective tolerances. In general, power inputs 110 and 110' may come from different sources, e.g., different circuits, and may have different electrical characteristics. For example, power inputs 110 and 110' may each have different voltages, frequencies, and/or phase relationships, in the case of a multi-phase voltage input, e.g., a three-phase system, commonly used. Although power inputs 110 and 110' may be AC voltages having frequencies commonly in the range of 50 to 800 Hz with their respective tolerances, one or more of power inputs 110 and 110' could be DC voltages.

Power inputs 110 and 110' are each coupled to respective power conversion stages 120 and 120'. Each power conversion stage 120 and 120' generally operates in the same manner, which will be described later in terms of exemplary embodiments. Such coupling can be through conventional switch gear, e.g., contactors and circuit breakers. Power factor correction for each power input branch 110 and 110' is generally accomplished by monitoring line voltage (or voltages for multi-phase voltage inputs), and controlling system 100 to drive line input current (or currents) to be in phase, i.e., 0 degree phase angle, or to have at least a reduced phase angle with respect to the line voltage. Power factor correction produces low input current distortion and phase shift to ensure high power factor. This reduces reactive power in the system, and thereby allows greater efficiency to be achieved on the shore power or dockside generation side or other source of input power.

Power inputs 110 and 110' may be considered to be fully independent inputs which share power from available sources to increase the total output power available in system 100. When power inputs 110 and 110' are unequal in power, power may be provided from inputs 110/110' proportional to their individual ability to provide power. Power inputs 110 and 110' may also be transformer isolated for compatibility with conventional ground fault current interrupters (GFCI).

Power conversion stages 120 and 120' are "universal" in the sense that they are each capable of accepting a wide range of power inputs 110/110', and a wide range of frequencies, including DC, to provide utility for international operation. Further, stages 120 and 120' are capable of automatically accepting multi-phase or single phase sources and, in the case of multi-phase sources, e.g., three-phase sources, power conversion stages 120 and 120' are phase-sequence tolerant, and will automatically accept any phase sequence. Power conversion stages 120 and 120' may include AC-DC rectification circuitry, for when one or more of power inputs 110/110' is an AC power source.

Combining stage 160 may convert either DC to AC or may convert DC to regulated DC by high frequency switching conversion to provide voltage output 170, as described below. The voltage and frequency (including DC) of voltage output 170, when generated and regulated by high frequency switching, provides fast load response and low voltage distortion, even with non-linear loads.

Voltage output 170 of combining stage 160 may be further coupled to "universal" output inverters in the sense that multiple output inverter stages, i.e., DC-AC inverters (not shown), can be connected in parallel or series to provide an augmented output voltage, i.e., either high or low output voltages, which match international standards. Further, universal output inverter stages (not shown) supplied by voltage output 170 may be connected in parallel, or phase shifted to provide either single, split phase, or three phase AC outputs.

In the case of DC to DC conversion, high frequency conversion of input DC to output DC reduces size weight and cost of combining stage 160, and provides transformer galvanic isolation of input to input and inputs to output. In addition, DC to DC conversion would allow the output DC to be a different voltage than the input DC voltage.

Figure 2:
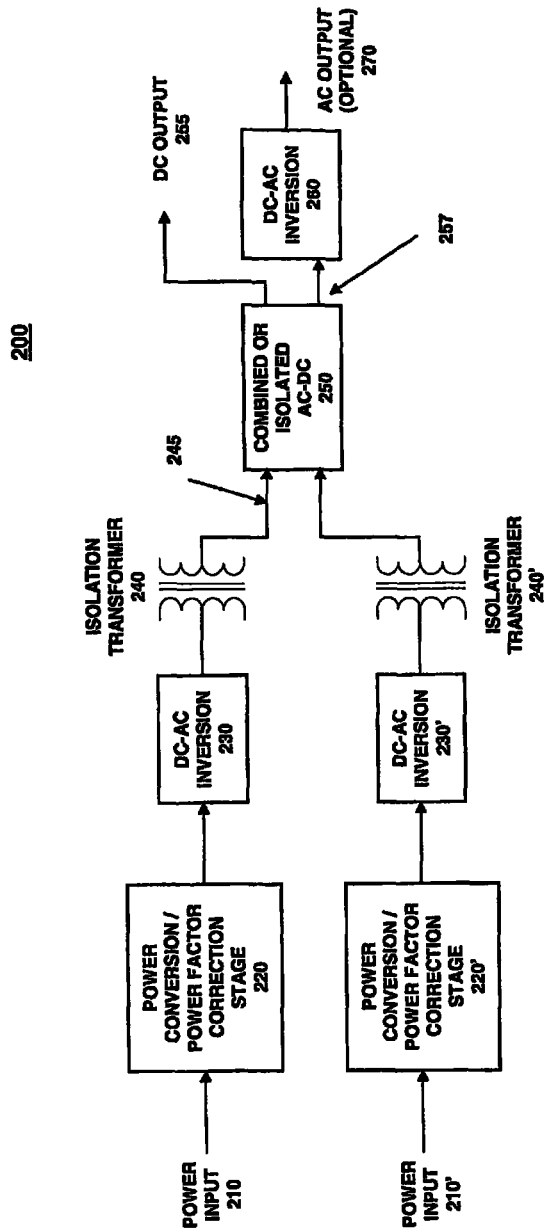
FIG. 2 depicts a variant embodiment of a system for power conversion useful for providing electrical power to a location which may not include one or more isolation transformers.

FIG. 2 depicts a variant embodiment of a system for power conversion which includes additional AC-DC rectification and either DC-AC inversion or DC-DC conversion, where the two independent voltage inputs are isolated by an isolation transformer. In this embodiment, system 200 receives power inputs 210 and 210', which may be described as above, having similar characteristics to power inputs 110 and 110'. Power conversion and power factor correction stages 220 and 220' may also be described as above, similar to power conversion stages 120 and 120', whose detailed operation and exemplary arrangement will be described below.

DC-AC inversion stages or units 230 and 230' need not necessarily be "universal" output inverters as described with respect to combining stage 160, above. Inversion stages 230 and 230' may convert the DC voltage respectively received from power conversion stage 220 to a fixed intermediate frequency AC voltage 245, for example. Intermediate frequencies in a band of 1-18 kHz or greater may be used, as these relatively high frequencies (in comparison to commercial power frequencies in use) can allow the use of smaller transformer size, while being reasonably controllable and implementable in practical circuits and components.

Intermediate frequency AC voltage 245 and its counterpart voltage from inversion stage 230' is rectified by combined or isolated AC-DC rectification stage 250 to produce a DC output voltage 255. Power path 257 may optionally be supplied to "universal" DC-AC conversion or inversion stage 260 to produce optional AC output voltage 270, which can have characteristics such that multiple output inverter stages can be connected in parallel or series to provide an augmented output voltage 270 user selectable to be either high or low output voltages, and which match international standards. Further, universal output inverter stages within DC-AC inversion stage 260 are capable of being connected in parallel, or phase shifted to provide either single, split phase, or three phase AC outputs.

FIGS. 3A through 3D illustrate a three-phase AC variant embodiment which can be related as an example of one branch of FIG. 1, for example. Three-phase voltage input 310, represented by phase voltages 310A, 310B, and 310C, are applied to input power filter circuit 300B, which is depicted in an exemplary fashion in FIG. 3C. Input power filter circuit 300B applies input line current through associated inductors L and line-to-line filter capacitors $C_{IN}$ to produce filtered phase voltages $\phi_A$, $\phi_B$, and $\phi_C$. The three filter capacitors filter harmonics which may be generated by AC-DC rectification stage 320 illustrated, in one embodiment, in FIG. 3B.

Figure 3A:
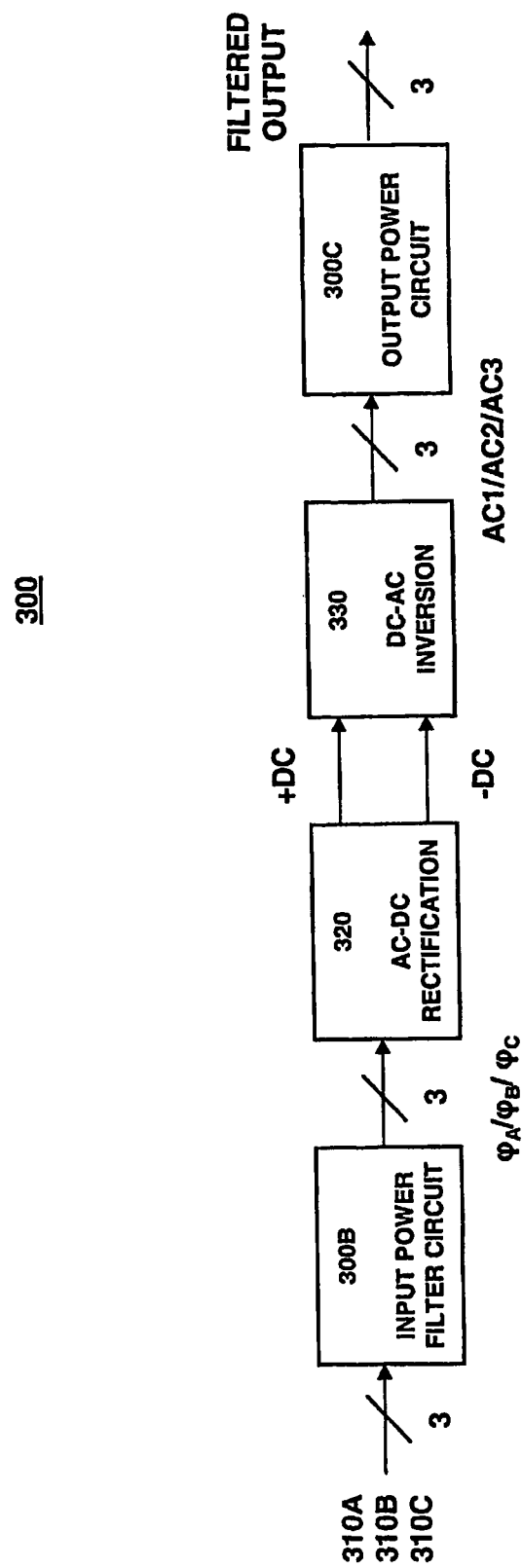
FIG. 3A shows a block diagram of a single channel of an exemplary three-phase implementation of a multi-input power conversion system.
Figure 3B:
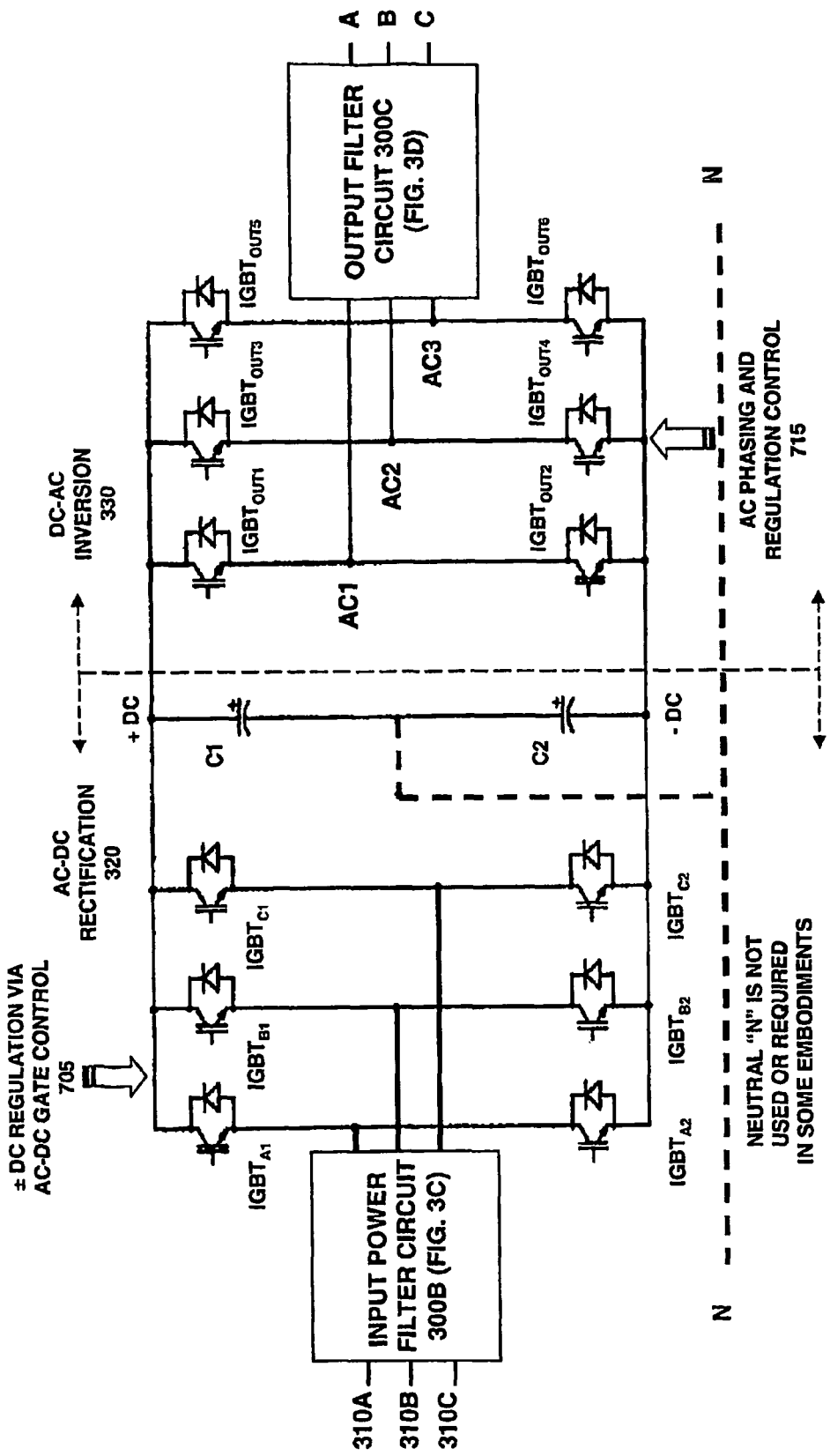
FIG. 3B illustrates simplified circuit schematic diagrams of AC to DC rectification and DC to AC inversion subsystems of FIG. 3A.

As exemplarily illustrated in FIG. 3B, filtered phase voltages $\phi_A$, $\phi_B$, and $\phi_C$ are respectively each applied through an inductor to an associated intermediate node between pairs of power transistors. Power transistor pairs $IGBT_{A1}$ and $IGBT_{A2}$, $IGBT_{B1}$ and $IGBT_{B2}$, and $IGBT_{C1}$ and $IGBT_{C2}$, are shown as insulated gate bipolar transistors (IGBT), which combine the respective advantages of bipolar and MOSFET devices in high power applications. Alternatively, the transistors could be chosen as either power MOSFET or other power switching devices, with circuit modifications made as necessary to accommodate the differences underlying MOSFET and IGBT device operation. Other functionally equivalent power devices could also be used, as known by those skilled in the art.

For simplicity and clarity, FIG. 3B does not show all the wiring, e.g., gate signal conductors, necessary for operation of the IGBTs in AC-DC rectification section 320. Instead, multiple AC-DC gate control signals 705 derived from AC-DC PWM gate controller 710 (see FIG. 7) are only notionally represented, as it is known how to layout and arrange such control lines, once derived, either on printed wiring boards, or using other wiring schemes. Each IGBT shown in AC-DC rectification section 320 receives an associated gate control signal as an input to its gate electrode, i.e., one of multiple AC-DC gate control signals 705, which controls conduction of the associated IGBT.

Operation of AC-DC rectification section 320 will now be described with reference to only one phase, since the operation of the other two phases may be inferred from the below discussion. Filtered phase voltage $\phi_A$, for example, is applied to the intermediate node between the emitter of $IGBT_{A1}$ and the collector of $IGBT_{A2}$. Associated gate control signals of AC-DC gate control signals 705 are provided as inputs to gate electrodes of each of $IGBT_{A1}$ and $IGBT_{A2}$. As will be discussed later, multiple AC-DC gate control signals 705 are produced by AC-DC PWM gate controller 710 to control conduction of the various associated IGBTs in AC-DC rectification section 320.

AC-DC gate control signals 705 are timed and operatively derived by AC-DC PWM gate controller 710 to ensure, for example, conduction of $IGBT_{A1}$ and cut-off of $IGBT_{A2}$ with standard timing to generate boost (or buck) voltages. Similar descriptions of the conduction of IGBT pairs B1/B2 and C1/C2 are omitted for brevity.

Capacitors $C_1$ and $C_2$ may be series-connected across +DC and −DC to reduce ripple of the DC voltage. The connection to neutral node N is optional, and is not required nor used in some applications, and is therefore depicted as a dashed line located intermediate to $C_1$ and $C_2$, and used in some applications as a reference in various other parts of systems 300 or 400 (see FIG. 4A).

The voltage difference between +DC and −DC is sensed within the system, discussed later, and this difference may be regulated to a desired voltage value, e.g., 750V, in order to provide desired voltage input conditions for DC-AC inversion section 330.

DC-AC inversion section 330, in this exemplary three-phase embodiment, may include three pairs of series connected power transistors, e.g., $IGBT_{OUT1}$ and $IGBT_{OUT2}$, $IGBT_{OUT3}$ and $IGBT_{OUT4}$, and $IGBT_{OUT5}$ and $IGBT_{OUT6}$, which are similar in some respects to the transistor configuration in AC-DC rectification stage 320. The operation of DC-AC inversion section 330 will now be described with reference to FIG. 3B and only one output phase AC1, since the operation of this stage with respect to the other two output voltage phases AC2 and AC3 may be inferred from the below discussion.

As seen in the right-hand portion of FIG. 3B, the voltage between the top side of $C_1$ and the bottom of $C_2$ (i.e., differential voltage +DC and −DC) is applied between the collector of $IGBT_{OUT1}$ and the emitter of $IGBT_{OUT2}$. Associated gate control signals of multiple DC-AC PWM gate control signals 715 for AC phasing and regulation are provided by DC-AC PWM gate controller 720 (see FIG. 7) as inputs to gate electrodes of each of $IGBT_{OUT1}$ and $IGBT_{OUT2}$. As will be discussed later, multiple PWM gate control signals 715 may be produced as pulse-width modulation signals by PWM gate controller 720 to control conduction of the various associated IGBTs in DC-AC inversion section 330.

Figure 10:
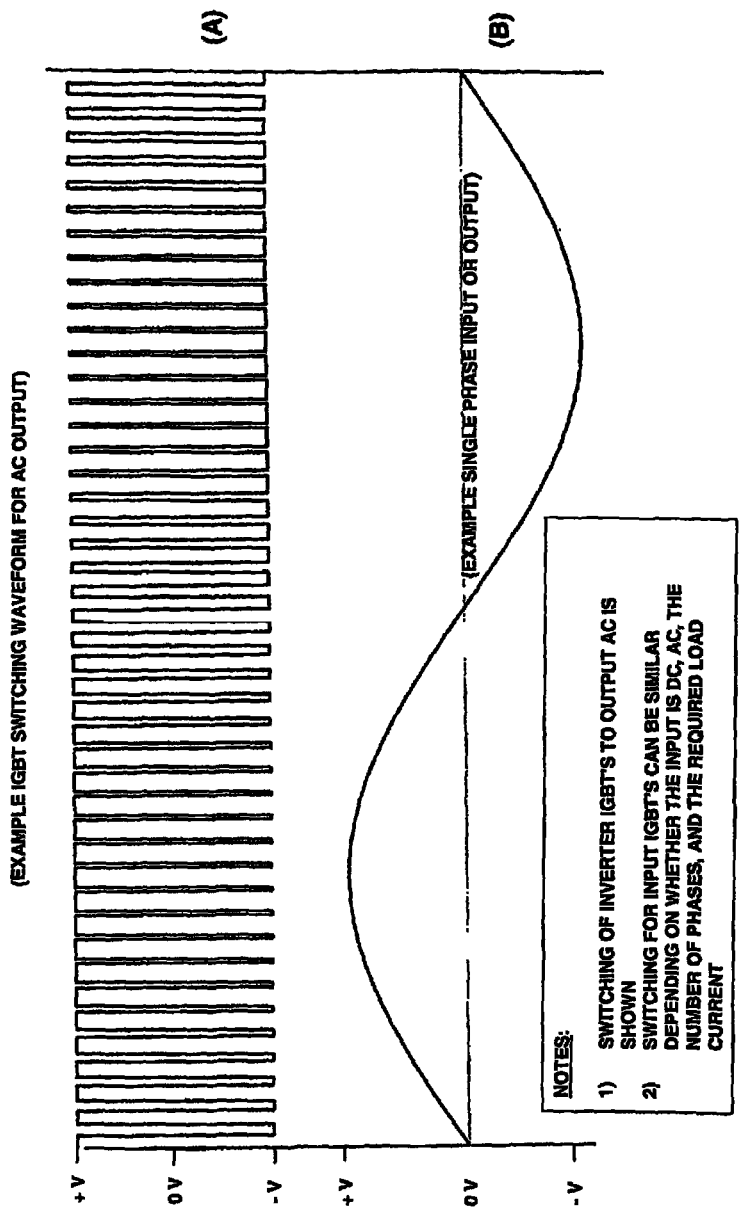
FIG. 10A is a diagram of a pulse width modulated signal which is used to control IGBT phasing of on-times to connect storage capacitors.
FIG. 10B is a sinusoidal voltage showing an exemplary phase of the power converter input and output voltages relative to power transistor switching.

DC-AC PWM gate control signals 715 are timed and operatively derived by AC-DC gate controller 720, for example, to form output voltages AC1-AC3 as periodic sinusoidal or near sinusoidal voltages. An exemplary PWM control signal or IGBT switching waveform is represented in FIG. 10A, which shows IGBT phasing of on-times to connect storage capacitors. The gate drive signal for the high side $IGBT_{OUT1}$ looks similar to FIG. 10A. The low side $IGBT_{OUT2}$ gate drive signal is the inverse of the PWM waveform in FIG. 10A. The sine wave of FIG. 10B represents either a single phase input or output voltage, e.g., AC1, after filtering to remove harmonics associated with any non-sinusoidal voltage, and to form a waveform which is more nearly sinusoidal. This voltage depicts the phase of power converter input and output voltages relative to IGBT capacitor connections. Similar descriptions of the conduction of pulse-width modulated IGBT pairs OUT3/OUT4 and OUT5/OUT6 are omitted for brevity.

With respect to FIGS. 10A and 10B, it should be noted that with a DC input, the IGBT "on" pulsewidth also adjusts, depending on whether the DC input is high or low compared to the regulated output.

Figures 3C, 3D:
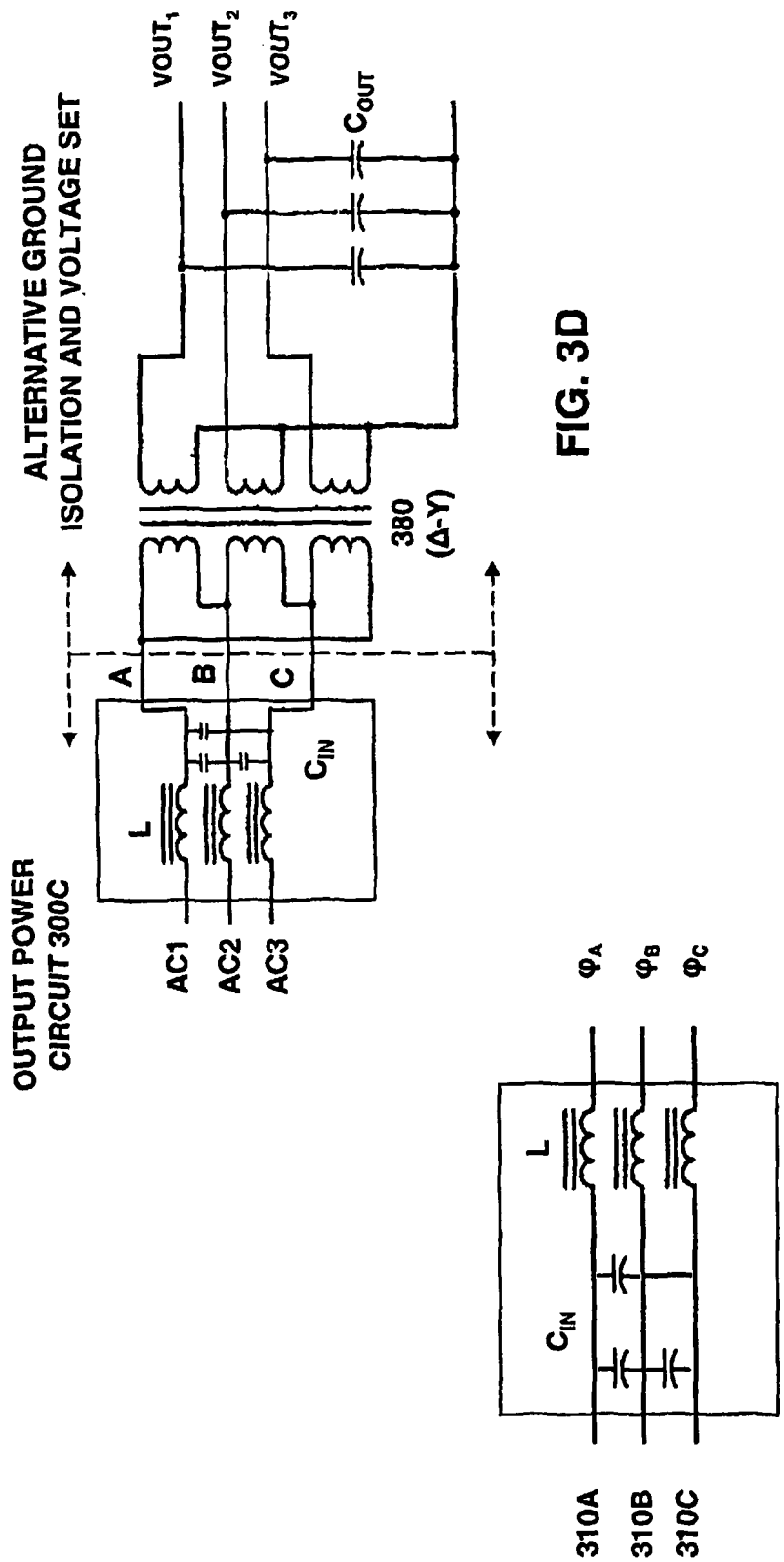
FIG. 3C illustrates an exemplary embodiment of the input power filter circuit of FIG. 3A.
FIG. 3D illustrates an output power circuit in an alternative implementation which may be used with the subsystems of FIG. 3A and the embodiment of FIG. 1.

In a variant embodiment similar to system 100 in FIG. 1, output voltage phases AC1-AC3 are provided through associated filter inductors and line-to-line capacitors to output power circuit 300C, shown in FIG. 3D. Output voltage phases AC1-AC3 are applied to filter inductors L and line-to-line capacitors $C_{IN}$ to further filter harmonic-related noise. The filtered output voltage phases AC1-AC3 are made available to isolation transformer 380, which may be considered as part of system 300, or which may be a pre-existing non-system isolation transformer, i.e., located onboard an alternative ground isolation and voltage set, e.g., on a ship. Isolation transformer 380 may convert output phase voltages AC1-AC3 from a "Δ" configuration to a "Y" configuration ("Δ-Y") with output voltages $V_{OUT1}$, $V_{OUT2}$, and $V_{OUT3}$. Capacitors $C_{OUT}$ may be provided to filter each phase voltage $V_{OUT1}$, $V_{OUT2}$, and $V_{OUT3}$ by removing or reducing non-fundamental frequency components in the outputs.

Three pairs of IGBTs in DC-AC inversions 330 in FIG. 3B are used to develop three phase voltage outputs AC1-AC3. However, in another variant embodiment, illustrated for one input branch in FIGS. 4A and 4B, DC voltages (i.e., +DC and −DC) are supplied to DC-AC inversion stage 430, which only has two IGBT pairs, $IGBT_{OUT1/OUT2}$ and $IGBT_{OUT3/OUT4}$. These IGBT pairs are controlled, in a similar manner as in DC-AC inversion section 330 by PWM gate control signals 715. Control signals 715 operate to cause conduction of the IGBT pairs in a manner which effectively converts the input DC voltage to an AC voltage at a desired frequency. However, IGBT pairs OUT1/OUT2 and OUT3/OUT4 are driven in an anti-phase manner, i.e., $IGBT_{OUT1}$ and $IGBT_{OUT4}$ are driven to conduct at the same time as $IGBT_{OUT2}$ and $IGBT_{OUT3}$ are driven to cutoff; while $IGBT_{OUT2}$ and $IGBT_{OUT3}$ are driven to conduction while $IGBT_{OUT1}$ and $IGBT_{OUT4}$ are driven to cutoff. The voltages at the outputs of the IGBT pairs are generally periodic square waves.

Figure 4A:
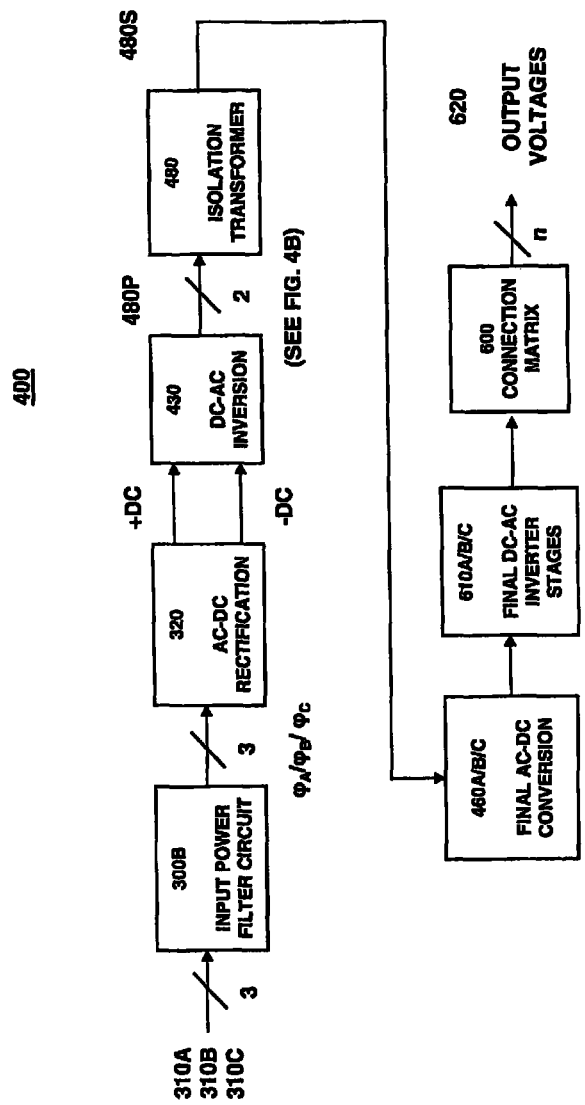
FIG. 4A depicts a variant embodiment showing one three-phase power input branch and associated subsystems of a multi-input power conversion system which may be coupled together in one branch, such as depicted in either of the embodiments of FIG. 1 or 2
Figure 4B:
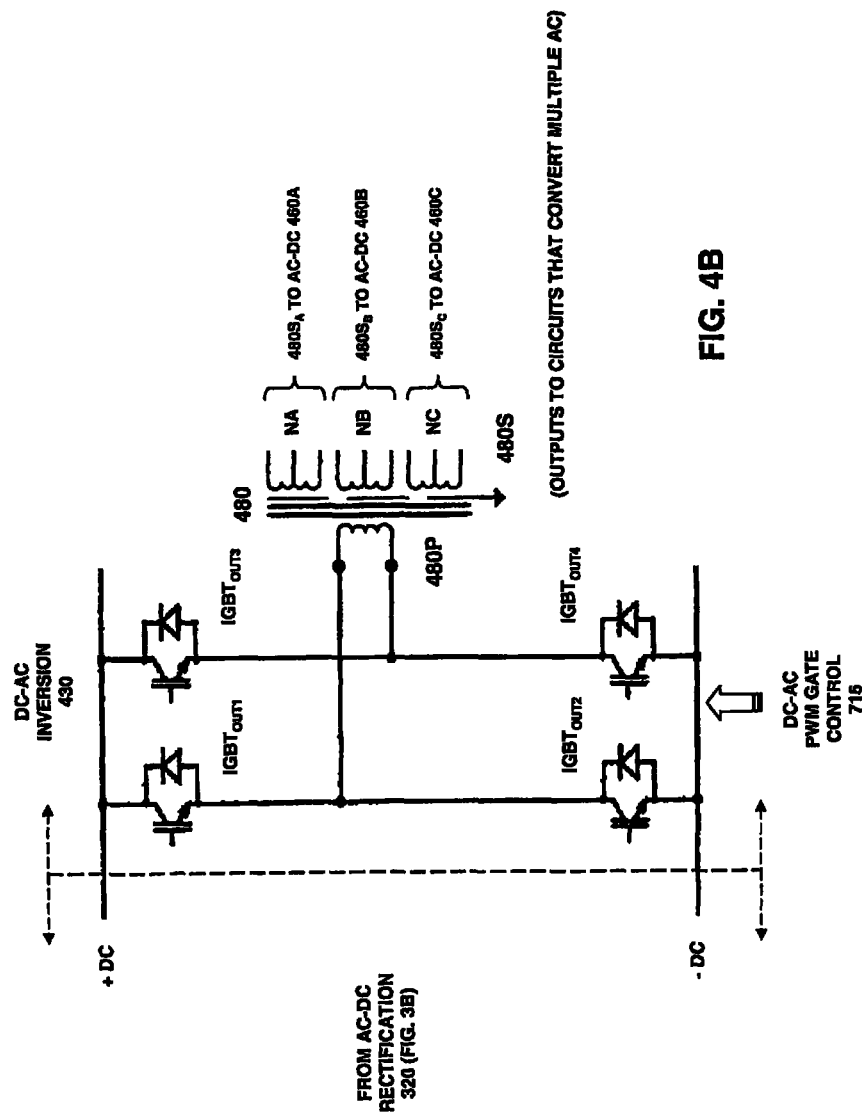
FIG. 4B illustrates a variant DC-AC inversion circuit.

As shown in FIG. 4B, intermediate nodes between these IGBT pairs are supplied to the primary side 480P of isolation transformer 480 as a differential type voltage input. Secondary side 480S of isolation transformer 480 may have three independent windings, i.e., $480S_A$, $480S_B$, and $480S_C$, which are used to develop the three-phase output voltages which may provide outputs to circuits that convert multiple AC voltages to multiple DC voltages, for example. Voltages developed on the secondary side at $480S_A$, $480S_B$, and $480S_C$ are supplied to AC-DC sections 460A, 460B, and 460C, respectively, as illustrated in FIGS. 4C-4E. Neutral connections for each phase, i.e., NA, NB, and NC, may be also established as shown for further use by following system components and circuitry, although a neutral connection is not always necessary or desired.

As exemplified in FIGS. 4C-4E, AC-DC sections 460A, 460B, and 460C each include four diodes arranged in a full-wave bridge rectifier configuration. Inductive line filters are also included on the high and low sides of each of sections 460A, 460B, and 460C to reduce DC ripple. The AC voltages supplied by transformer secondary 480S are therefore rectified to DC voltages presented between voltage nodes 1-2, 3-4, and 5-6. Output filter capacitors are omitted for brevity.

Voltage nodes 1-6 in sections 460A, 460B, and 460C correlate to nodes 1-6 found as inputs to final DC-AC inversion stages 610A, 610B, and 610C, shown in various output voltage configurations in FIGS. 6A-6E. DC-AC inversion stages 610A, 610B, and 610C are each defined by dashed lines in FIG. 6A; these dashed lines have been omitted for clarity in FIGS. 6B-6E.

The various output voltage configurations in FIGS. 6A-6E are represented by switched output voltages 620 which may be, in various user-selectable configurations, different combinations of voltages found at terminals A, B, C, and N, the optional system neutral node. These various user-selectable output voltage configurations are determined through operation of connection matrix 600, as shown in block diagram form in FIG. 4A and FIGS. 6A-6E, and described below.

Although control signals 715 are not shown explicitly in conjunction with DC-AC inversion stages 610A, 610B, and 610C, and have been omitted for clarity, these DC-AC inversion stages may be considered to operate similarly to DC-AC inversion stage 430 in FIG. 4B, which is controlled by DC-AC PWM gate control signals 715 to produce an AC voltage having the desired output frequency characteristics.

The various output voltage configurations of FIGS. 6A-6E are represented in associated phasor diagram forms in FIGS. 9A-9E, respectively. FIG. 9A represents a single phase voltage; FIG. 9B represents additive single phase voltages; FIG. 9C represents a biphase voltage output; FIG. 9D represents a three phase output, and FIG. 9E represents an additive three phase voltage output. These phasor diagrams correlate, respectively, to circuits shown in FIGS. 6A-6E. These exemplary phasor diagrams are not intended to be exhaustive or limiting, but are provided merely to illustrate possible voltage/current relationships available by interconnection of various nodes in multiple universal output inverter stages.

Figure 5A:
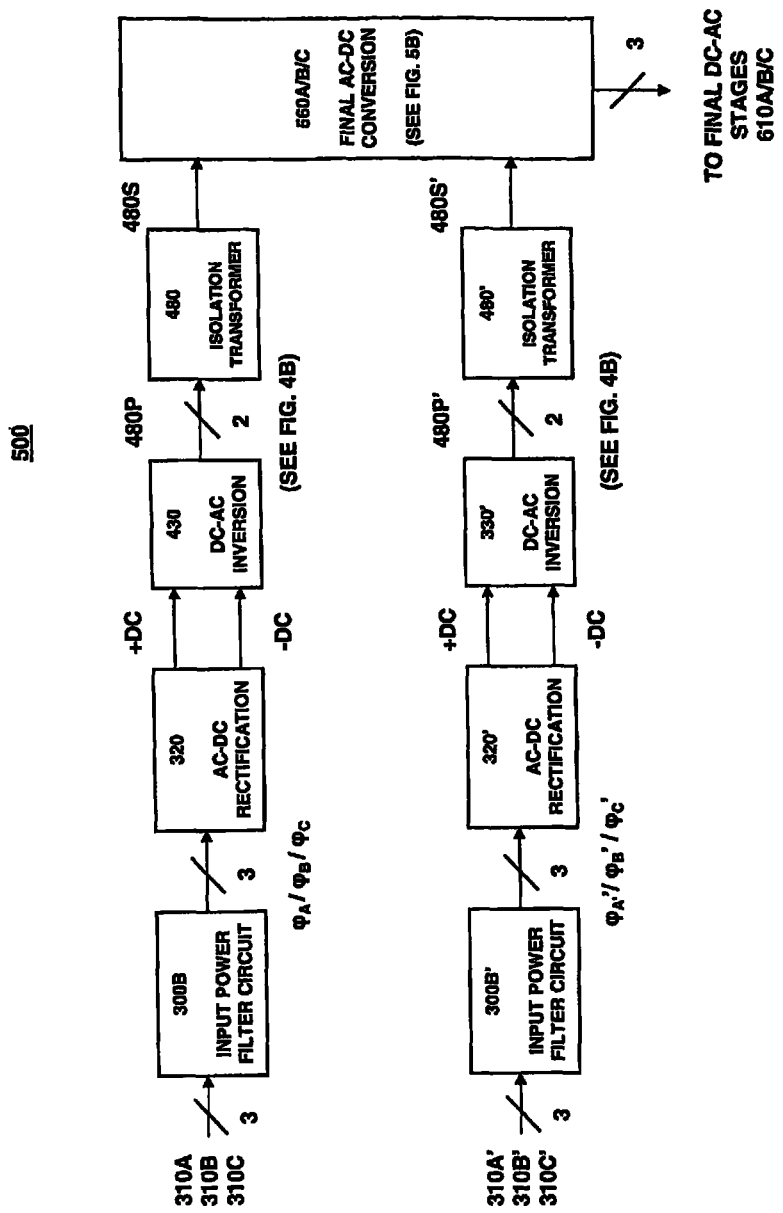
FIG. 5A depicts a variant embodiment of the system of the disclosure.

Another variant embodiment is illustrated in FIG. 5A. The upper branch of system 500 starting with AC voltage inputs 310A/B/C through isolation transformer 480 is, similar to that described with respect to FIG. 4A, and will not be repeated for the sake of brevity. The upper branch of FIG. 5A may be identical or at least very similar to the upper branch of FIG. 4A. Prime notation (') is used in the lower branch on the various blocks to denote such similarity.

Figure 5B:
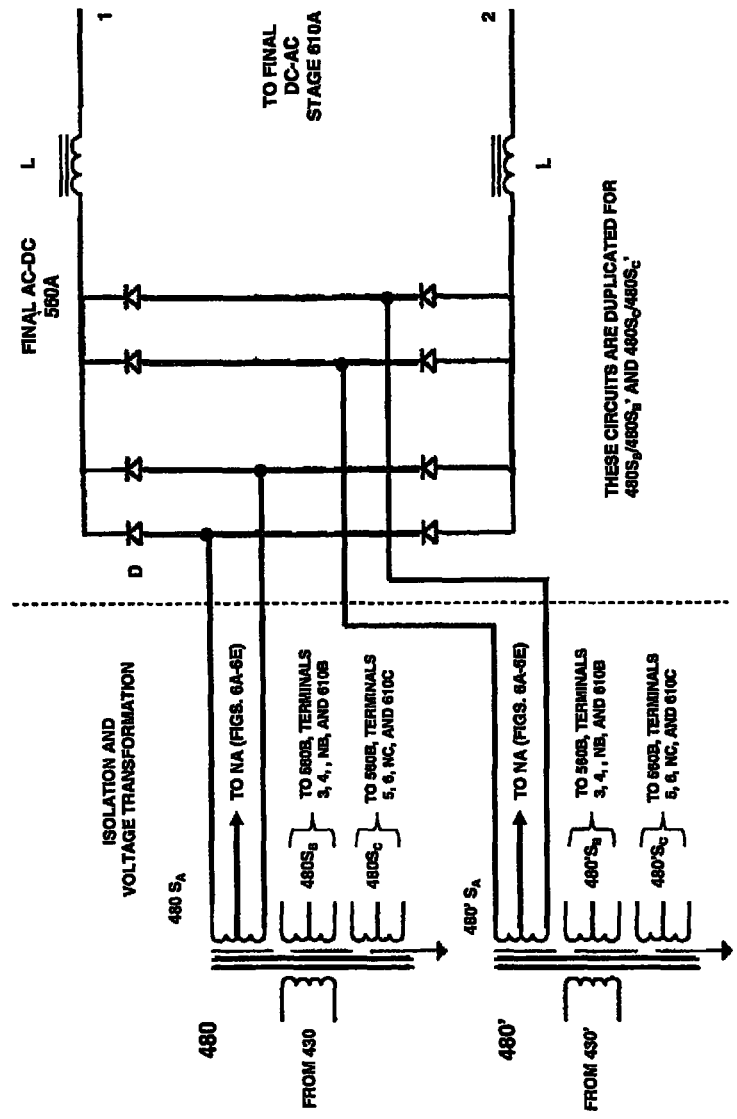
FIG. 5B provides another variant of an AC-DC rectifier block.
Figures 6A, 6B, 6C:
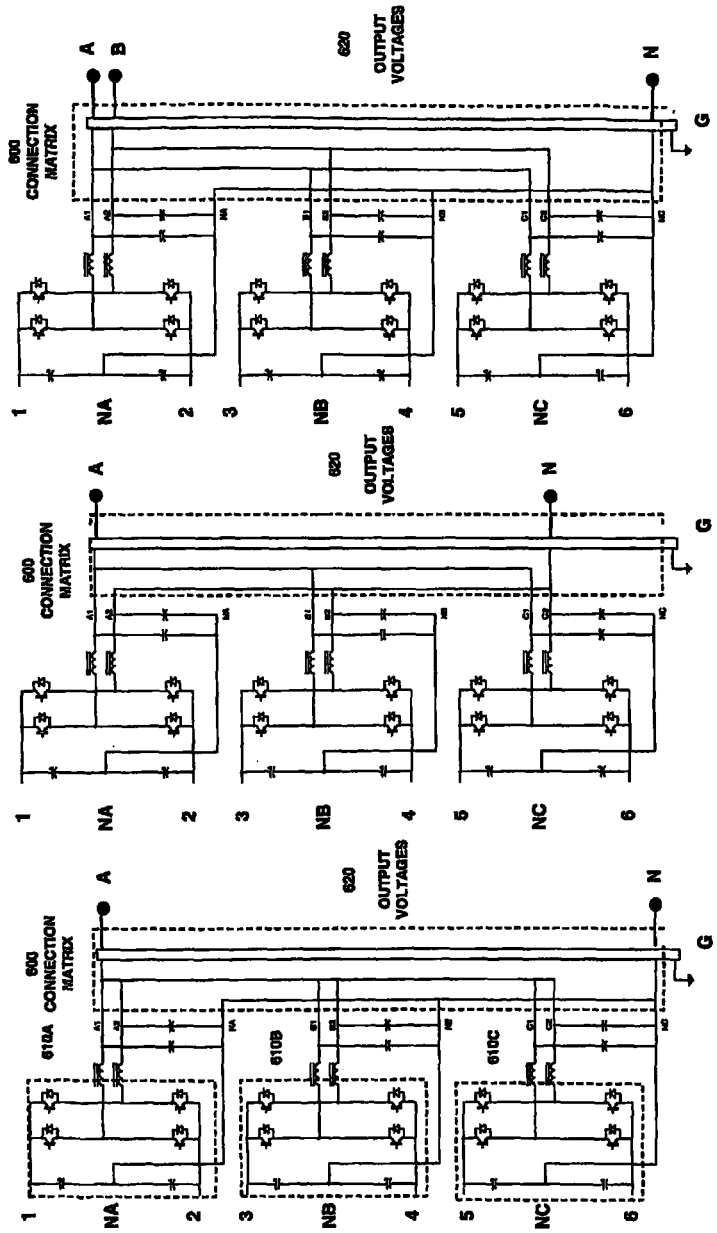
FIGS. 6A-6E show various implementations of a three phase output circuit arrangement.
Figure 6E:
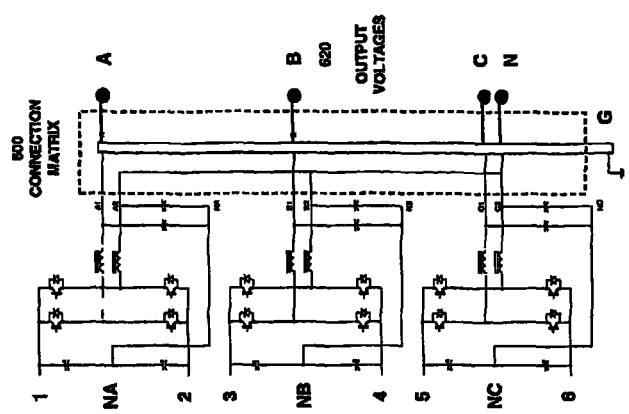
Figure 6D:
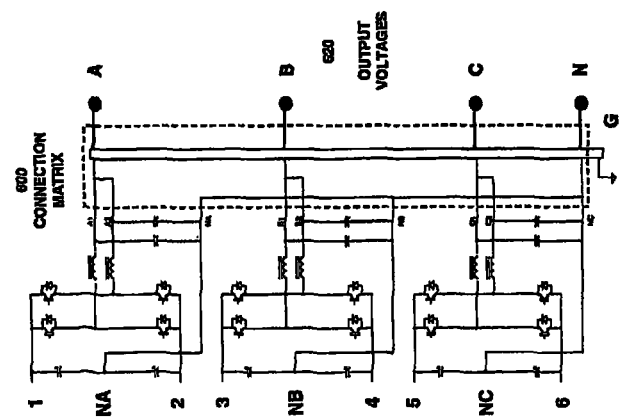

FIG. 5B depicts the output of isolation transformers 480 and 480' coupled to final AC-DC rectifier section 560A. Rectifier sections 560B and 560C may be identical to 560A, and they are not shown, as an understanding of their operation may be determined from the description of 560A. Secondary winding 480S$_A$ of isolation transformer 480 is coupled to the diodes in the full-wave bridge rectifier as shown. The center tap of secondary winding 480S$_A$ may be connected to the A-phase neutral, NA. Secondary windings 480S$_B$ and 480S$_C$ are similarly coupled to final AC-DC rectifier sections 560B and 560C (similar to 560A), and their associated optional phase neutrals, NB and NC.

As can be seen, one feature of this embodiment is that power is shared between the two inputs. For example, secondary terminals 480 S$_A$ and 480' S$_A$ from isolation transformers 480 and 480', respectively, both supply power to final AC-DC rectifier stage 560A. Similar arrangements are made for each secondary winding pair and final AC-DC rectifier stages 560B and 560C.

Ripple in the DC voltages provided to terminals 1 and 2 is reduced by the filtering action of inductors L in final AC-DC rectifier stage 560A. Voltage terminal pairs 1-2, 3-4, and 5-6 are supplied to final DC-AC stages 610A, 610B, and 610C, respectively. Operation of DC-AC stages 610A, 610B, and 610C has been provided above, in the discussion of the embodiment of FIGS. 4A-4E.

Figure 7:
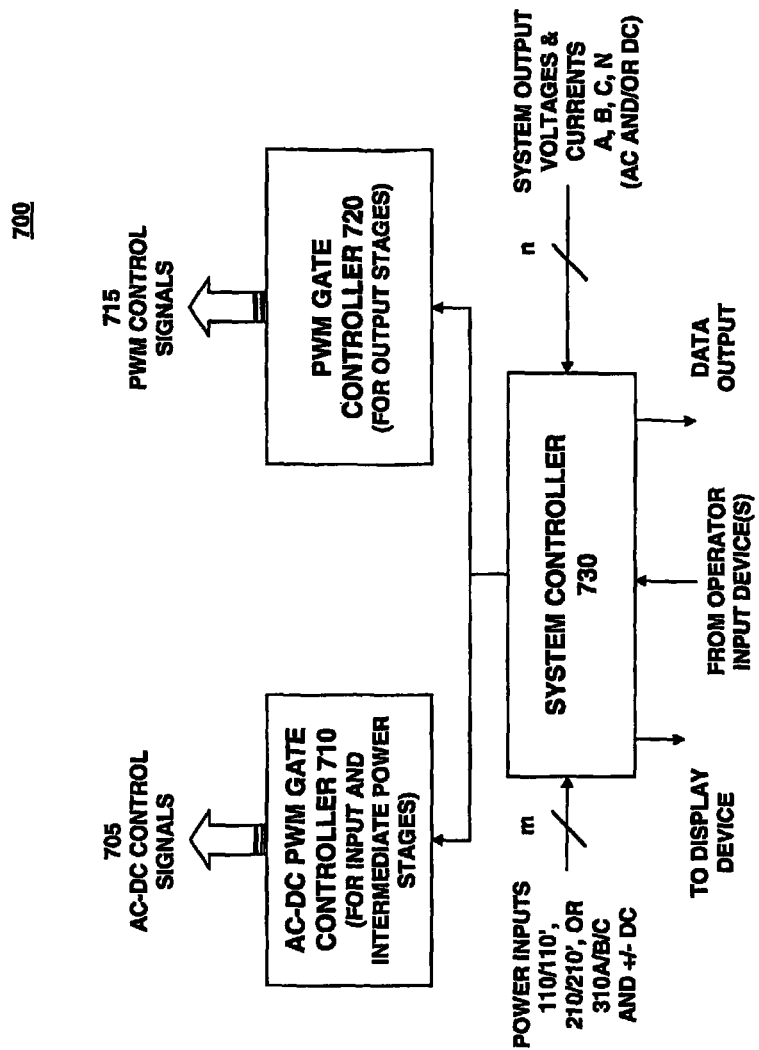
FIG. 7 provides a block diagram of a control system.

A block diagram of control system 700 and the generalized data flow and control signals used in any of systems 100, 200, 300, 400, and 500 is provided in block diagram form in FIG. 7.

System controller 730 may be a computer or special purpose processor operating software or firmware to carry out the functions described below. System controller 730 receives user inputs from operator input devices, e.g., from a keyboard or console with an input device. The operator can input desired voltage output parameters, for example.

Controller 730 also receives "m" multiple voltage inputs, i.e., power inputs 110/110', 210/210', or 310A/310B.310C, where "m" is the number of inputs, and may also receive the +/−DC reference voltage, as shown in FIGS. 3B and 4A, for example. Controller 730 also receives "n" multiple system output voltages, e.g., three voltages in the case of three-phase operation. In addition, line currents (input and output for each phase) are also measured. Currents may be measured by conventional Hall effect current sensors (not shown) in conjunction with known line current inductors (not shown).

Controller 730 may also provide outputs compatible for visual or printed display, and may also include output ports configured to operate in accordance with standard serial or parallel output protocols, e.g., RS232, RS422, USB, or a modem, etc., and may further be capable of providing data to a local area network (LAN). Warnings or generator startup/shut down signals may also be provided to alternative power generating equipment (not shown), e.g., a shipboard generator.

Controller 730 provides control signals useful for causing AC-DC PWM gate controller 710 to generate AC-DC control signals 705, to control the operation of the rectifier stages of the system. Controller 730 may also provide control signals useful for causing PWM gate controller 720 to produce PWM control signals 715 which control the inversion of DC voltages to AC voltages which have desired frequency and phase characteristics. Simplified exemplary timing is depicted in FIG. 10A.

Figure 8:
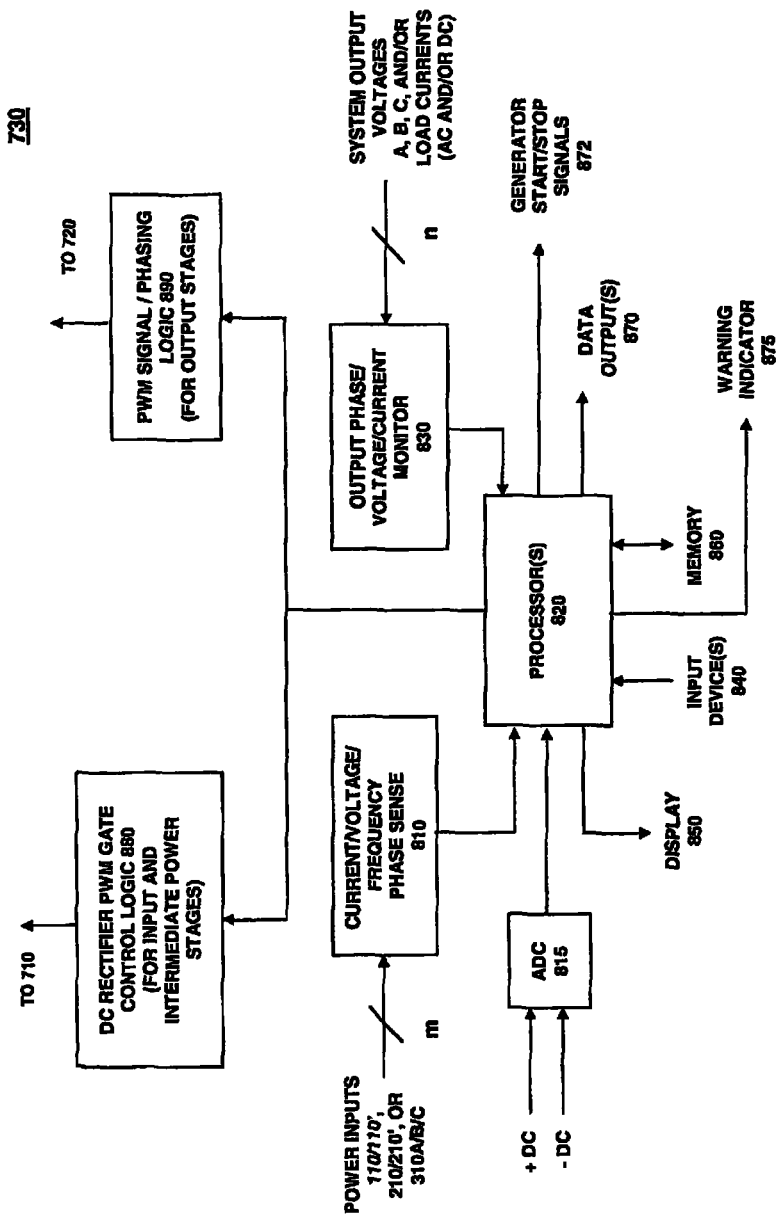
FIG. 8 provides further detail of the system controller of FIG. 7.

FIG. 8 depicts functional block diagrams which represent the operation of system controller 730. Processor 820 may be a personal computer, or special purpose processor which is capable of receiving inputs from current/voltage/frequency phase sense 810, +/−DC voltages (e.g., FIG. 3B) through analog-to-digital converter (ADC) 815, output phase/voltage/current monitor 830, input device(s) 840 (e.g., a keyboard), and memory 860. Processor 820 may optionally include multiple processors or co-processors, as necessary.

Processor 820 may provide outputs or control/logic signals to display 850, memory 860, data outputs 870 (in data formats discussed above), generator start/stop signals 872, system warning indicator 875, DC rectifier PWM gate control logic 880, and PWM signal/phasing logic 890.

By use of data input by an operator, system controller 730 is effective to control and select the frequency of the AC output voltage(s), or to select one or more DC output voltages. The display output 850 may also indicate the parameters of the input and output voltages.

When input power available from a combination of the AC input voltages is reduced below a threshold value, system controller 730 may provide an output signal useful for initiating a generator startup sequence for an electrical generator (not shown). When the supply voltage returns or is stabilized, system controller 730 may provide an output signal useful for initiating a generator shut down sequence for the electrical generator.

If one or more power inputs to the system is disconnected or fails for some other reason, system controller 730 may provide appropriate control signals which will ensure input redundancy by reallocating the load sharing to the remaining power inputs, to ensure that a stable output voltage is maintained.

Figure 11:
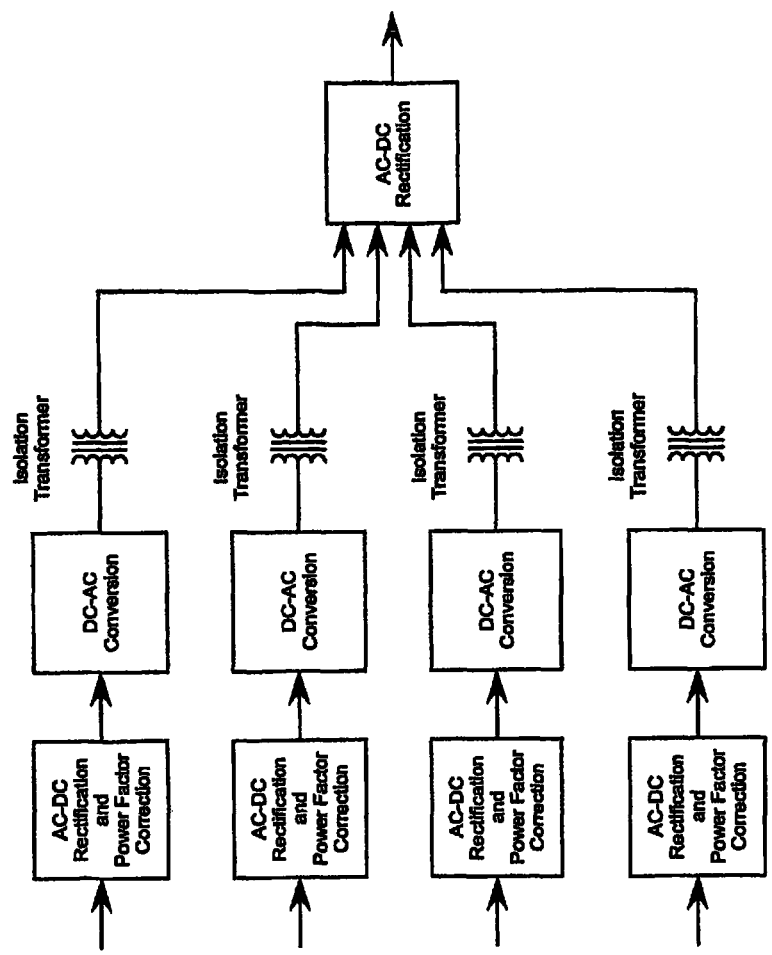
FIG. 11 illustrates an embodiment of a multiple source power converter with universal inputs.

An exemplary multiple source power converter with universal inputs is illustrated in FIG. 11, wherein four AC/DC inputs are each applied to an associated AC-DC rectification and Power Factor Correction stage. Conversion (inversion) from DC to AC is then accomplished for each leg; the AC outputs from the inverters are each coupled through an associated isolation transformer, and are combined in an AC-DC rectification stage, to provide a DC output for the system. More than four input power sources could be used.

Figure 12:
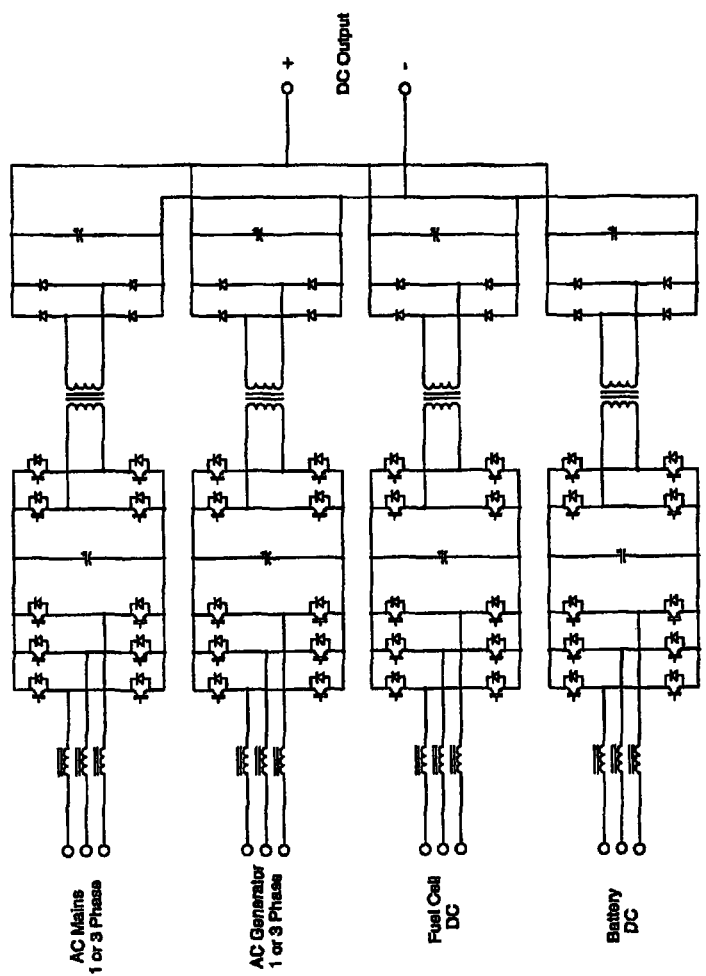
FIG. 12 illustrates another embodiment of a multiple source power converter with universal inputs.

A further exemplary embodiment of the power converter of FIG. 11 is illustrated in FIG. 12, showing four different types of power inputs, with IGBT-based conversion of the input power. The input power is converted to DC, if not initially provided as a DC voltage, then an intermediate AC voltage is generated in each leg. The intermediate AC voltages are coupled through associated isolation transformers for each power input to a rectification/combination stage which converts and combines the intermediate AC voltages in each leg to provide an isolated DC output for the system.

In this example, the four power inputs include single or three phase AC mains, one or three phase AC generator, a fuel cell providing DC power, or a DC battery power source. More than four different power inputs may be used and combined, as desired. The IGBT conversion and inversion is similar to that described above, and will not be repeated for the sake of brevity.

Figure 13:
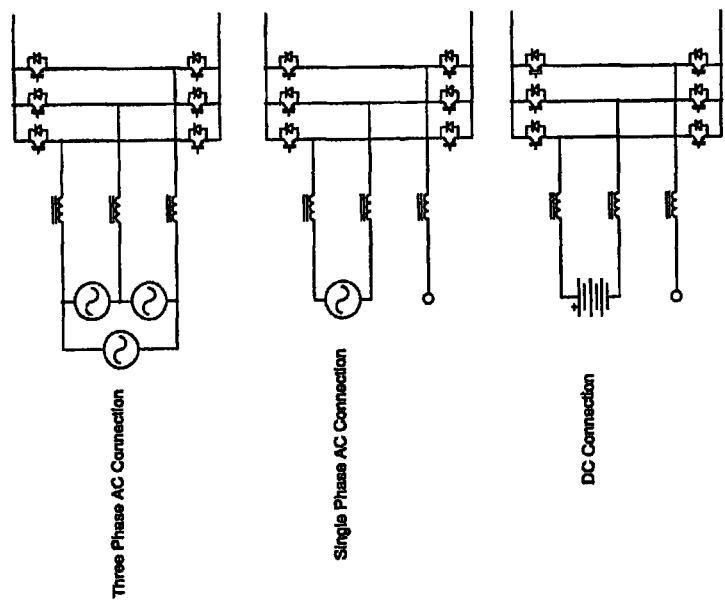
FIG. 13 illustrates another embodiment of a multiple source power converter with universal inputs.

Three examples showing different input configurations of a multiple source power converter with universal inputs are shown in FIG. 13. A three phase connection is shown at the top, a single phase AC connection is shown in the middle, and a DC connection is depicted at the bottom of FIG. 13. This depiction is not intended to be exhaustive or limiting, but is intended to provide an indication of the wide variety of input power sources/configurations that may be used in the system and method of this disclosure.

Related to the disclosure above, a method for converting electrical power from multiple sources includes sensing a frequency and a voltage of a first electrical power input and converting the first electrical power input to a first DC voltage. A frequency and a voltage of a second electrical power input is sensed, and the second electrical power input is converted to a second DC voltage. The first and second DC voltages may be combined, and the combined DC voltages are inverted to provide a selectable AC voltage. The frequency of the selectable AC voltage is controlled to match an external load requirement.

INDUSTRIAL APPLICABILITY

The various embodiments discussed above have applicability in power conversion, including converting power having undesirable characteristics, for example, frequency or voltage, to a form which may be useful in a particular application, for example, shipboard, ground-based, or aircraft power applications. The system and method of this disclosure permit isolation between independent input sources such that ground fault connection devices do not activate, whether or not the independent inputs are grounded or not.

Specific applications of the system and method include control of lasers, communication or electronic warfare receivers, inverters, and power for DC or AC motors.

What is claimed as new and desired to be protected by Letters Patent of the United States is:

1. A system capable of combining electrical power from two or more disparate power sources, the system comprising:
    a first stage configured to receive a plurality of inputs, each of the plurality of inputs from one of the two or more disparate power sources, a first of the two or more disparate power sources having a first load and a first power level associated therewith and a second of the two or more disparate power sources having a second load and a second power level associated therewith, the first stage providing a first DC output for each of the plurality of inputs;
    a power conversion stage receiving each of the first DC outputs and generating at least one DC output to one or more output terminals at a configured voltage, frequency and phase, wherein the power conversion stage further converts the first DC output from the first power source and the first DC output from the second power source into the at least one DC output in proportion to a load level and a power level of the first power source and the second power source, wherein the power conversion stage further provides an AC output at an output frequency different from frequencies of the power sources.

2. The system of claim 1, wherein the first stage further includes:
    switching circuitry for selective switching, responsive to switching control signals, to generate the at least one DC output from the first input from the first power source and the second input from the second power source in proportion to the load level and the power level of the first power source and the second power source; and
    a controller for generating the switching control signals responsive to the load level and the power level of each of the first power source and the second power source.

3. The system of claim 1, wherein the power conversion circuitry further includes:
    first and second conversions stages configured to produce an isolated voltage as output thereof responsive to each of the DC outputs; and
    circuitry for combining at least the isolated voltages and providing the at least one DC output to one or more associated output terminals.

4. The system of claim 1, wherein the power conversion stage further provides two AC output voltages having different phase characteristics from each other.

5. The system of claim 1, wherein the first power source is a single phase AC voltage source and the second power source is a three-phase AC voltage source.

6. The system of claim 1, wherein the first power source is a DC voltage source and the second power source is an AC voltage source.

7. The system of claim 1, wherein the power conversion stage further includes a DC-AC inverter.

8. The system of claim 1, further comprising:
a system controller which at least receives, as inputs thereof, user inputs, the inputs from the first and second power sources, and the AC output;
wherein, the system controller includes means to provide control signals operative to control switching within the power conversion stage; and
wherein, responsive to the control signals, one or more characteristics of the AC output are controlled to user-defined values.

9. The system of claim 8, wherein the one or more characteristics of the at least one AC output controlled by the system controller include a voltage magnitude and a phase of the AC output.

10. The system of claim 1, wherein the power conversion stage controls a frequency of the AC output to be a selectable frequency in the range of approximately 50 to 800 Hz. based upon user input.

11. The system of claim 1, wherein the power conversion stage controls the frequency of the AC output voltage when at least the first input voltage is an AC voltage in the range of approximately 50 to 800 Hz.

12. The system of claim 1, wherein at least one of the power sources comprises a three-phase AC input voltage source.

13. The system of claim 1, wherein the circuitry for combining at least the isolated voltages comprises an isolation transformer.

14. A system for electrical power conversion, the system comprising:
a first DC rectification stage which receives a first AC input having first voltage, first frequency, first phase characteristics, first load level and first power level and providing a first DC voltage as an output thereof;
a second DC rectification stage receiving a second AC input having second voltage, second frequency, second phase characteristics second load level and second power level and providing a second DC voltage as an output thereof; and
a power conversion stage receiving each of the DC outputs and generating at least one DC output to one or more output terminals at a configured voltage, frequency and phase, wherein the power conversion stage further converts the first input from the first power source and the second input from the second power source into the at least one DC input in proportion to a load level and a power level of the first power source and the second power source, wherein the power conversion stage further comprises:
first and second voltage inverters receiving the first and second DC voltages, respectively, and providing first and second AC voltages at an intermediate stage to associated isolation transformers;
a final DC rectification stage coupled to outputs of the associated isolation transformers receiving isolated first and second intermediate AC voltages and to provide providing at least a final DC voltage; and
an output voltage inverter stage which converts the final DC voltage to one or more output AC voltages at an output frequency having one or more phases.

15. A method of power conversion, comprising:
receiving a plurality of inputs, each of the plurality of inputs from one of two or more disparate power sources, a first of the two or more disparate power sources having a first load and a first power level associated therewith and a second of the two or more disparate power sources having a second load and a second power level associated therewith;
providing a first DC output for each of the plurality of inputs; and
converting the first DC output from the first power source and the second DC output from the second power source into the at least one DC output in proportion to a load level and a power level of the first power source and the second power source, the at least one DC output at a configured voltage, frequency and phase, wherein the step of converting further includes providing an AC output at an output frequency different from frequencies of the power sources.

16. The method of claim 15, wherein the step of converting further includes:
selectively switching responsive to switching control signals to generate the at least one DC output from the first input from the first power source and the second input from the second power source in proportion to the load level and the power level of the first power source and the second power source; and
generating the switching control signals responsive to the load level and the power level of each of the first power source and the second power source.

17. The method of claim 15, wherein the step of converting further includes:
producing an isolated voltage responsive to each of the DC outputs; and
combining at least the isolated voltages; and
providing the at least one DC output to one or more associated output terminals.

18. The method of claim 15, wherein the step of converting further includes providing two AC output voltages having different phase characteristics from each other.

19. The method of claim 15, wherein the first power source is a single phase AC voltage source and the second power source is a three-phase AC voltage source.

20. The method of claim 15, wherein the first power source is a DC voltage source and the second power source is an AC voltage source.

21. A system capable of combining electrical power from two or more disparate power sources, the system comprising:
a first stage configured to receive a plurality of inputs, each of the plurality of inputs from one of the two or more disparate power sources, a first of the two or more disparate power sources having a first load and a first power level associated therewith and a second of the two or more disparate power sources having a second load and a second power level associated therewith, the first stage providing a first DC output for each of the plurality of inputs;
a power conversion stage receiving each of the first DC outputs and generating at least one DC output to one or more output terminals at a configured voltage, frequency and phase, wherein the power conversion stage further converts the first DC output from the first power source and the first DC output from the second power source into the at least one DC output in proportion to a load level and a power level of the first power source and the second power source, wherein the power conversion stage further includes a DC-AC inverter.

22. A system capable of combining electrical power from two or more disparate power sources, the system comprising:
a first stage configured to receive a plurality of inputs, each of the plurality of inputs from one of the two or more disparate power sources, a first of the two or more disparate power sources having a first load and a first power level associated therewith and a second of the two or more disparate power sources having a second load and a second power level associated therewith, the first stage providing a first DC output for each of the plurality of inputs;

a power conversion stage receiving each of the first DC outputs and generating at least one DC output to one or more output terminals at a configured voltage, frequency and phase, wherein the power conversion stage further converts the first DC output from the first power source and the first DC output from the second power source into the at least one DC output in proportion to a load level and a power level of the first power source and the second power source, wherein the power conversion stage further provides two AC output voltages having different phase characteristics from each other.

23. A method of power conversion, comprising:

receiving a plurality of inputs, each of the plurality of inputs from one of two or more disparate power sources, a first of the two or more disparate power sources having a first load and a first power level associated therewith and a second of the two or more disparate power sources having a second load and a second power level associated therewith;

providing a first DC output for each of the plurality of inputs; and converting the first DC output from the first power source and the second DC output from the second power source into the at least one DC output in proportion to a load level and a power level of the first power source and the second power source, the at least one DC output at a configured voltage, frequency and phase, wherein the step of converting further includes providing two AC output voltages having different phase characteristics from each other.

* * * * *